US012698221B2

(12) United States Patent
Rassoolkhani et al.

(10) Patent No.: US 12,698,221 B2
(45) Date of Patent: Aug. 4, 2026

(54) CONCENTRIC ELECTROCHEMICAL DEVICE

(71) Applicant: PowerTech Water, Inc., Lexington, KY (US)

(72) Inventors: Alan Rassoolkhani, Lexington, KY (US); Joseph Stieha, Lexington, KY (US); Timothy St. Onge, Lexington, KY (US)

(73) Assignee: POWERTECH WATER, INC., Lexington, KY (US)

( * ) Notice: Subject to any disclaimer, the term of this patent is extended or adjusted under 35 U.S.C. 154(b) by 281 days.

(21) Appl. No.: 18/432,517

(22) Filed: Feb. 5, 2024

(65) Prior Publication Data

US 2024/0262719 A1 Aug. 8, 2024

Related U.S. Application Data

(60) Provisional application No. 63/483,386, filed on Feb. 6, 2023.

(51) Int. Cl.
*C02F 1/46* (2023.01)
*C02F 1/461* (2023.01)
(Continued)

(52) U.S. Cl.
CPC ........ *C02F 1/46109* (2013.01); *C02F 1/4678* (2013.01); *C02F 2001/46133* (2013.01);
(Continued)

(58) Field of Classification Search
CPC ................ C02F 1/46109; C02F 1/4678; C02F 2001/46133; C02F 2001/46152;
(Continued)

(56) References Cited

U.S. PATENT DOCUMENTS 5,690,806 A 11/1997 Sunderland et al.
2014/0131217 A1* 5/2014 Buschmann .......... C01B 11/062
205/633

FOREIGN PATENT DOCUMENTS

CN 115231662 A 10/2022
DE 4003193 A1 8/1991
DE 4235834 A1 4/1994

OTHER PUBLICATIONS

International Search Report and Written Opinion for PCT/US2024/014411 issued May 7, 2024, 7 pages, European Patent Office, Rijswijk, New Zealand.

(Continued)

*Primary Examiner* — Waqaas Ali
(74) *Attorney, Agent, or Firm* — Fitch, Even, Tabin & Flannery LLP

(57) ABSTRACT

An electrochemical device for reducing a dissolved metal of a liquid stream includes a carbonaceous cathode surrounding a metal-containing anode and a separator arranged between the metal-containing anode and the carbonaceous cathode. The electrochemical device further includes either one of: a conductive cathode current collector housing on the carbonaceous cathode or a non-conductive cathode current collector housing on the carbonaceous cathode. The conductive cathode current collector housing includes at least one inlet and outlet for the liquid stream. The non-conductive cathode current collector housing includes at least one inlet and outlet for the liquid stream, and a metal shim arranged between the carbonaceous cathode and the non-conductive cathode current collector housing.

20 Claims, 8 Drawing Sheets

(51) Int. Cl.
 *C02F 1/467*   (2023.01)
 *C02F 101/20*   (2006.01)

(52) U.S. Cl.
 CPC *C02F 2001/46152* (2013.01); *C02F 2101/20*
     (2013.01); *C02F 2201/46* (2013.01)

(58) Field of Classification Search
 CPC ............. C02F 2101/20; C02F 2201/46; C02F
    2001/46161; C02F 2001/46171; C02F
    2101/22; C02F 2201/003; C02F 1/46114
 See application file for complete search history.

(56)      References Cited

OTHER PUBLICATIONS

Pourbaix, Marcel, 'Atlas of Electrochemical Equilibria in Aqueous Solutions,' 1974, 648 pages, National Association of Corrosion Engineers, Houston, TX, USA.

\* cited by examiner

CONCENTRIC ELECTROCHEMICAL DEVICE

CROSS-REFERENCE TO RELATED APPLICATION

This application claims the benefit of U.S. Provisional Patent Application No. 63/483,386, filed Feb. 6, 2023, which is incorporated by reference herein in its entirety.

BACKGROUND

The present disclosure relates to electrochemical devices, and more particularly, to concentric electrochemical devices.

Various methods are used to remove heavy metals and other target species from wastewater and process water. Such methods include, for example, chemical precipitation, ion exchange, adsorption, membrane filtration, reverse osmosis, and electrochemical treatment. Electrochemical cells for removing heavy metals include one or more pairs of electrodes, an anode and a cathode, that remove or reduce the concentration of target species from an input stream and thereby provides an output stream with decreased content of the target species. In particular, when a sufficient external voltage (i.e., potential) is applied to the electrodes, non-spontaneous chemical reactions occur that reduce the concentration of target species, e.g., metal ions, halide ions, derivatives of target metals or target halides, and/or particulate metals, in the aqueous or liquid solution. Depending on the process conditions, e.g., applied voltage, pH, type and concentration of target species, electrode spacing, and/or cell design, target species are selectively removed from the solution by various processes, including but not limited to, physical adsorption to an electrode; electrical attraction (i.e., capacitive adsorption) to an electrode; and/or electron transfer reactions that directly or indirectly create new target species (i.e., Faradaic reactions) that become immobilized on an electrode or precipitated in solution.

SUMMARY

According to embodiments, an electrochemical device for reducing a dissolved metal of a liquid stream includes a carbonaceous cathode surrounding a metal-containing anode and a separator arranged between the metal-containing anode and the carbonaceous cathode. The electrochemical device further includes either one of: a conductive cathode current collector housing on the carbonaceous cathode or a non-conductive cathode current collector housing on the carbonaceous cathode. The conductive cathode current collector housing includes at least one inlet and outlet for the liquid stream. The non-conductive cathode current collector housing includes at least one inlet and outlet for the liquid stream, and a metal shim arranged between the carbonaceous cathode and the non-conductive cathode current collector housing.

According to other embodiments, an electrochemical device for reducing a dissolved metal of a liquid stream includes a metal-containing cathode core, a carbonaceous anode, and a separator arranged between the metal-containing cathode and the carbonaceous anode. The electrochemical device further includes either one of a conductive anode current collector housing on the carbonaceous anode, or a non-conductive cathode current collector housing on the carbonaceous anode. The conductive anode current collector housing includes at least one inlet and outlet for the liquid stream. The non-conductive cathode current collector housing includes at least one inlet and outlet for the liquid stream, and a metal shim arranged between the carbonaceous anode and the non-conductive cathode current collector housing.

Still, according to other embodiments, an electrochemical device for reducing a dissolved metal of a liquid stream includes a carbonaceous anode, a metal-containing cathode, and a conductive anode current collector rod structure at a core of the electrochemical device and in contact with the carbonaceous anode. The device also includes a separator arranged between the carbonaceous anode and the metal-containing cathode. The device further includes either one of a conductive cathode current collector housing on the metal-containing cathode, or a non-conductive cathode current collector housing on the metal-containing cathode. The conductive cathode current collector housing includes at least one inlet and outlet for the liquid stream. The non-conductive cathode current collector housing includes at least one inlet and outlet for the liquid stream, and a metal shim arranged between the metal-containing cathode and the non-conductive cathode current collector housing.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Many electrochemical devices remove heavy metals and other target species from wastewater by plating or precipitating metals from solution onto a metallic electrode. However, challenges or drawbacks associated with these methods include lack of specificity due to the electrode materials chosen and the dimensions of the device, insufficient metals capacity due to the volume and porosity of the electrode used for the metal removal, and diminished device performance due to the choice of electrode materials.

Accordingly, described herein are electrochemical devices and methods that employ surfaces of a carbon-based cathode, rather than on a metallic electrode, to remove heavy metals and other target species from wastewater. The devices and methods selectively remove (e.g., by plating, precipitating, and/or adsorbing) heavy metals and other target species onto adsorption sites of the carbonaceous cathodes. The devices and methods employ an asymmetric configuration with a metallic anode and carbonaceous cathode, each with different geometric surface areas and electrode volumes, to optimize the capacity of the carbon electrode towards the particular target species being removed from solution. Such asymmetry provides advantages of creating higher current density at the opposing metallic electrode and maximizing the operational time for the carbonaceous electrode to be used for metal removal. The devices and methods further employ a conductive current collector as a housing, which provides electrical and mechanical advantages. For example, an even distribution of voltage across the device maximizes the number of possible electrical connection points, decreases the potential for voltage leaks, and provides a higher temperature and pressure tolerance.

Figure 1A:
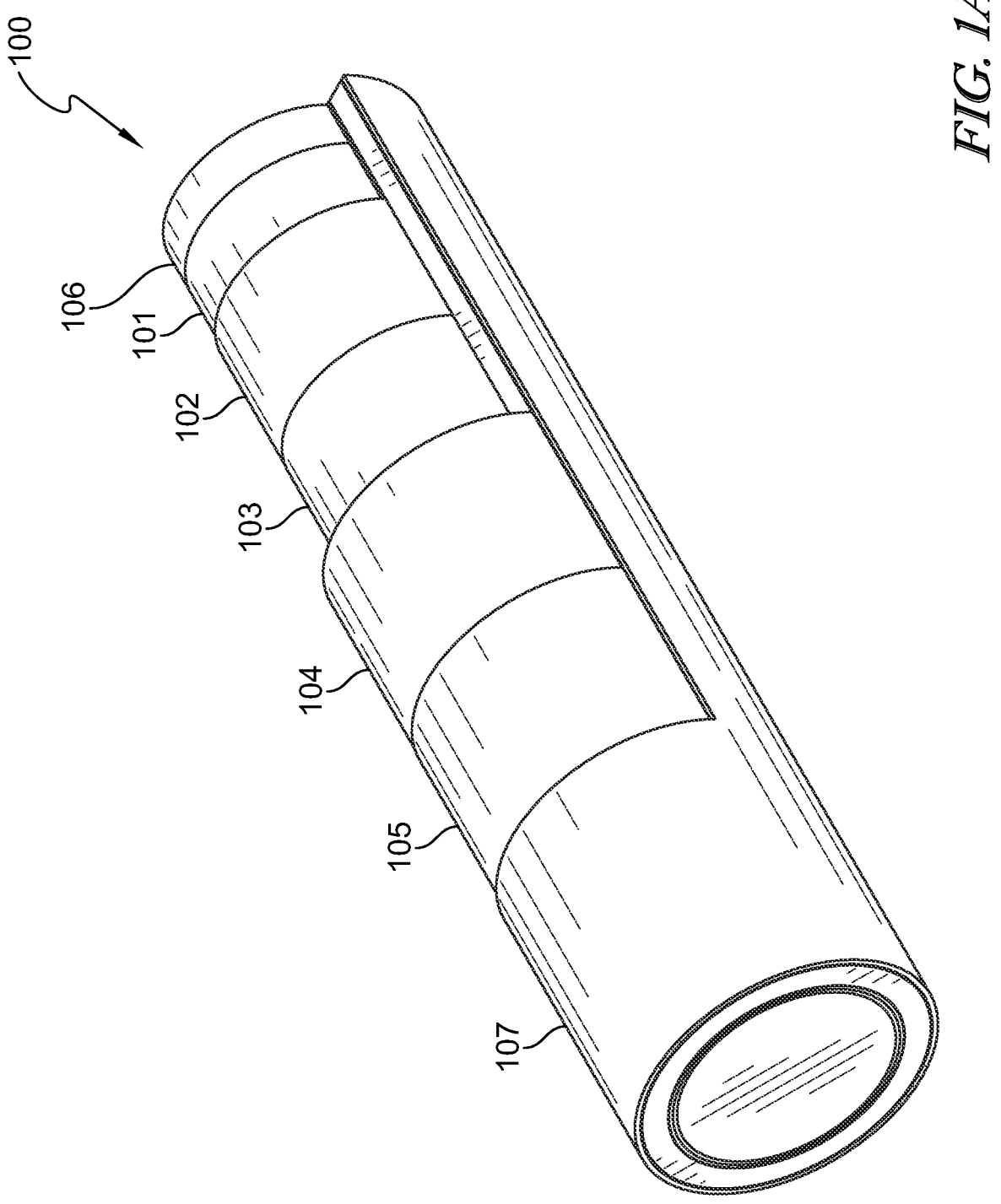
FIG. 1A is a cutaway view of a concentric electrochemical device.

The carbonaceous (i.e., carbon-based) electrode described herein is part of an electrochemical device shown in FIG. 1A in some embodiments (e.g., second electrode 104 in FIG. 1A described below). However, the carbon-based electrode is not limited to such devices. In FIG. 1A, electrochemical device 100 treats an input stream of liquid (e.g., water, an aqueous solvent, a non-aqueous solvent, or a combination thereof) with one or more target species. In FIG. 1C, the input stream enters through an inlet 108 at a first end of the housing 107 and is treated to at least partially remove or reduce the content of the one or more target species in the aqueous solution of the input stream, providing a treated output stream that exits at a second end of the housing 107 through an outlet 109. In some embodiments, the first end and second end of the housing 107 are bottom and tops of the housing 107 when the electrochemical device is oriented in a vertical orientation. In other embodiments, the first end and the second end of the housing are left and right sides of the housing 107 when the electrochemical device is oriented in a horizontal orientation. End caps 110 are located at either end of the electrochemical device. The output stream includes a reduced content of the target species than the input stream and is then further processed as desired.

The electrochemical device 100 includes a first electrode 101 and a second electrode 104 contained inside the housing 107. In some embodiments the first electrode 101 is a metal-containing (i.e., metal-based or metallic) anode and the second electrode 104 is a carbonaceous (i.e., carbon-based) cathode. The second electrode 104 is formed of a single piece of carbon-containing material and surrounds the first electrode 101. Although one piece or sheet of a second electrode 104 is shown, the electrochemical device 100 is not limited to one piece and in other embodiments includes carbon material that is packed to fill the remaining cell volume surrounding the first electrode 101 within the housing 107. In other embodiments, the second electrode 104 is composed of a plurality of planar carbon pieces with an annular hole therethrough that are stacked.

Electrochemical devices with carbonaceous (i.e., carbon-based) electrodes provide a highly efficient and environmentally friendly process to remove and reduce the content of target species (e.g., heavy metals and other targets species, such as impurities) from wastewater. By using the Pourbaix diagram (or potential/pH diagram) of the target species, which illustrates possible stable (equilibrium) phases of the target species in an aqueous electrochemical system, a desired applied potential (V) can be selected and applied to selectively remove the target species, for example, by reducing or converting the target species (e.g., $Cr(VI) \rightarrow Cr(III)$), on an anode or a cathode. Further, upon application of an appropriate voltage, electrochemical devices with one or more carbon-based electrodes remove the target species by reduction (e.g., conversion of copper cation or chromate anion species by electron transfer) at the carbonaceous cathode surface and/or electroplating (i.e., plating or electrodepositing) on the carbonaceous (i.e., carbon-based) cathode. Over time, the target species is electrochemically reduced or removed to decrease its concentration in the output stream after treatment. In one or more embodiments, the target species is reduced from about 80 to about 8 parts per million (ppm) in the output stream. In other embodiments, the target species is reduced from about 70 to about 100 ppm to about 10 to about 1 ppm in the output stream. In some embodiments, the target species is reduced from a starting concentration of about or in any range between about 70, 75, 80, 85, 90, 95, and 100 ppm to an end concentration about or in any range between about 10, 8, 6, 4, 2, or 1 ppm.

In embodiments, the electrochemical device 100 further includes electrical contacts or electrical connections 111 (FIG. 1C) and associated wiring (not shown) between the electrodes. The electrical contacts and associated wiring provide the necessary electrical connections to the electrical power supply (not shown). The power supply with associated wiring provides a direct current (DC) voltage, an alternating current (AC) voltage, or constant current, depending on the target species, electrodes, and configuration.

In one or more embodiments, the second electrode 104 and the first electrode 101 are porous materials that allow for aqueous fluid flow therethrough. In other embodiments, the first electrode 101 is non-porous and does not allow for aqueous fluid flow therethrough.

In some embodiments, the electrochemical device 100 includes one or more current collectors, including current collector 106 and/or housing 107. The current collector 106 is attached to or in contact with the first electrode 101. In some embodiments, the current collector 106 is optional and not included in electrochemical device. The first electrode 101 (metal-based anode) surrounds the current collector 106.

The housing 107 is arranged on or in contact with the second electrode 104. In some embodiments, the housing 107 is also a current collector that surrounds and houses the electrode stack. The current collector housing 107 is, for example, a metal-based cylinder that also forms the housing. In embodiments, the current collector 106 is a solid metal-based conductive rod at the core of the electrochemical device. The current collector 106 and housing 107 acting as current collectors are electric bridging components that collect electrical current generated at the attached electrode and reduce electrical losses within the electrochemical device 100, and thus are conductive. In one or more embodiments, the concentric layers in the electrode stack are wrapped around the metal-based rod current collector 106 at the core to provide tension and contact the first electrode 101. In some embodiments, the first electrode 101 is a film or a sheet that is cast onto the current collector 106. The housing 107 current collector which is on or in contact with the carbon-based cathode (second electrode 104), and the current collector 106 that is attached to or in contact with the metal-based anode (first electrode 101), are the same or different materials.

The current collector 106 is a solid material, or alternatively, a porous material. The current collector 106 is a metal sheet, a foil sheet, a mesh sheet, a metal rod, and/or a metal tube. For example, the current collector 106 is a conductive anode current collector and is non-porous, a solid rod, or a combination thereof. The housing 107 current collector is a solid (i.e., non-porous) material in some embodiments.

Non-limiting examples of materials for the current collector 106 and housing 107 include one or more conductive metals, for example, aluminum, copper, graphite, titanium, stainless steel, or a combination thereof.

In one or more embodiments, the housing 107 is attached to or in contact with the second electrode 104, without the metal shim 105 therebetween. In one or more embodiments, the housing 107 acting as a current collector is directly on or in contact with the first electrode 101 (metal-based anode), and the current collector 106 is directly on or in contact with the second electrode 104 (carbon-based cathode) (see FIG. 2A). In some embodiments, the conductive anode current collector 106 is in contact with the metal-containing anode (first electrode 101), and the metal-containing anode (first electrode) is arranged between the conductive anode current collector 106 and the separator 103 (FIG. 1A).

In embodiments, the housing 107 arranged on, directly attached to, or in contact with, the second electrode 104 is a planar structure or a cylinder with a thickness of about 0.01 to about 100 millimeters. In some embodiments, the housing 107 has a thickness of about 0.1 to about 0.4 millimeters. In other embodiments, the housing 107 has a thickness of about or in any range between about 0.01, 0.05, 0.1, 0.15, 0.20, 0.25, 0.30, 0.35, 0.40, 0.45, 0.50, 0.55, 0.60, 0.65, 0.70, 0.75, 0.80, 0.85, 0.90, 1, 5, 10, 15, 20, 25, 30, 35, 40, 45, 50, 55, 60, 65, 70, 75, 80, 85, 90, 95, and 100 millimeters.

In embodiments, the current collector 106 arranged on, directly attached to, or in contact with the first electrode 101 is a rod structure with a diameter of about 1 to about 5 inches. In some embodiments, the current collector 106 has a diameter of about 25 to about 125 millimeters. In other embodiments, the current collector 106 has a diameter of about or in any range between about 25, 30, 35, 40, 45, 50, 55, 60, 65, 70, 75, 80, 85, 90, 95, 100, 105, 110, 115, 120, and 125 millimeters.

Figure 1B:
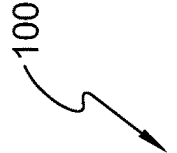
FIG. 1B is a top cross-sectional view of the concentric electrochemical device of FIG. 1A.
Figure 1B:
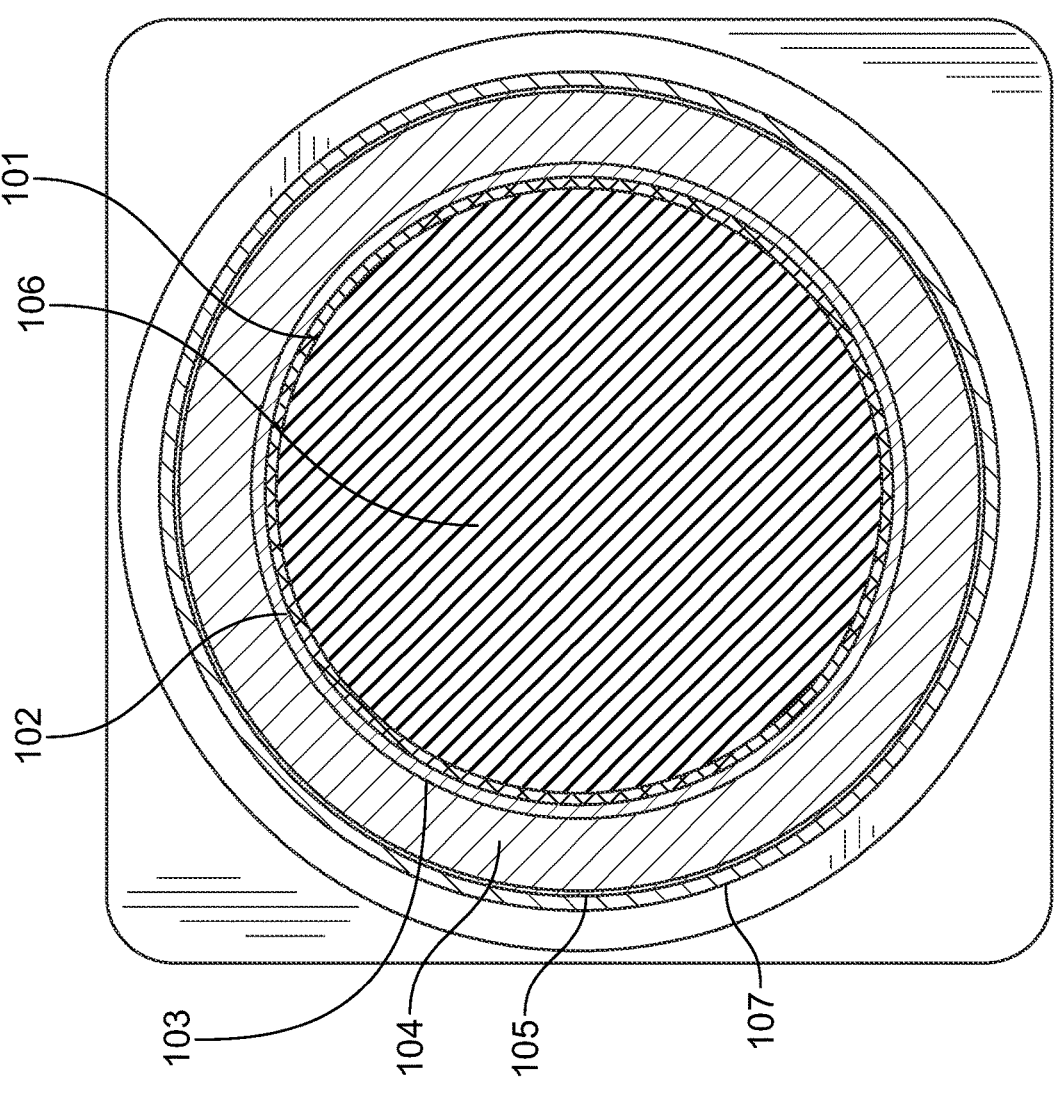
Figure 1B:
Figure 1C:
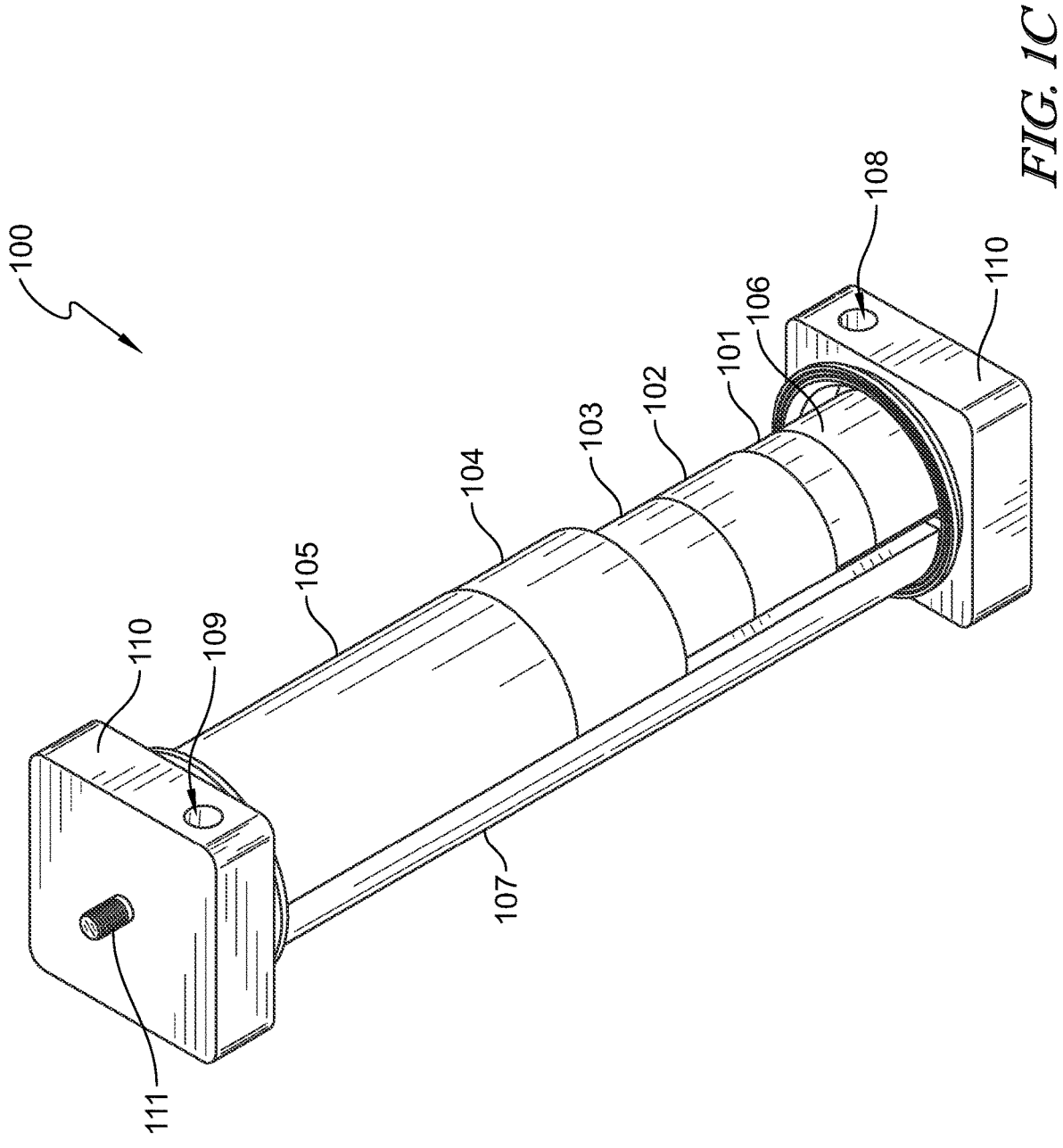
FIG. 1C is a cutaway view of concentric electrochemical device identifying the flow path and locations of electrical contacts.

In embodiments as shown in FIGS. 1A-1C, the housing 107 is solid (non-porous), and each of second electrode 104 and first electrode 101 is porous.

In some embodiments, the housing 107 is a non-conductive cathode current collector housing, and a metal shim 105 is arranged between the carbonaceous cathode (second electrode 104) and the non-conductive cathode current collector housing 107 (see FIG. 1A). The non-conductive material is, for example, a plastic material, e.g., polyvinyl chloride (PVC) or chlorinated polyvinyl chloride (CPVC).

In one or more embodiments, the electrochemical device 100 further includes a separator 103 arranged between the second electrode 104 and the first electrode 101. The separator 103 is a dielectric material that is permeable to ions in solution, facilitating both ion and water transport across it, and preventing physical contact between the electrodes and acts as an electrical insulator. Non-limiting examples of dielectric materials for the separator 103 include cellulosic-based materials, silica-based materials, ion exchange membranes, or any combination thereof.

In embodiments, the separator 103 is a planar structure (such as a sheet) arranged or formed into (such as by rolling) a cylindrical shape (with a hole therethrough) with a sidewall thickness of about 1 to about 1000 micrometers. In some embodiments, the separator 103 has a thickness of about 50 to about 250 micrometers. In other embodiments, the separator 103 has a thickness of about, or in any range between about 1, 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 micrometers.

In one or more embodiments, the electrochemical device 100 further includes a feed spacer 102 arranged between the first electrode 101 and the separator 103. The feed spacer 102 allows for sufficient water to access the anode chamber, providing water as the source for oxidation at the anode (first electrode 101, metal-containing) producing oxygen gas and protons, as well as electrons to feed reduction reactions at the cathode (second electrode 104, carbon-based). The feed spacer 102 is a chemical-resistant polymer mesh that provides a flow channel. Non-limiting examples of polymers for the feed spacer 102 include polypropylene, polyethylene, polytetrafluoroethylene (PTFE), nylon, ethylene tetrafluoroethylene (ETFE), or any combination thereof. In some embodiments, the feed spacer 102 is an expanded metal mesh. Non-limiting examples of expanded metal mesh for the feed spacer 102 include titanium, stainless steel, lead oxide, or any combination thereof.

Figure 2A:
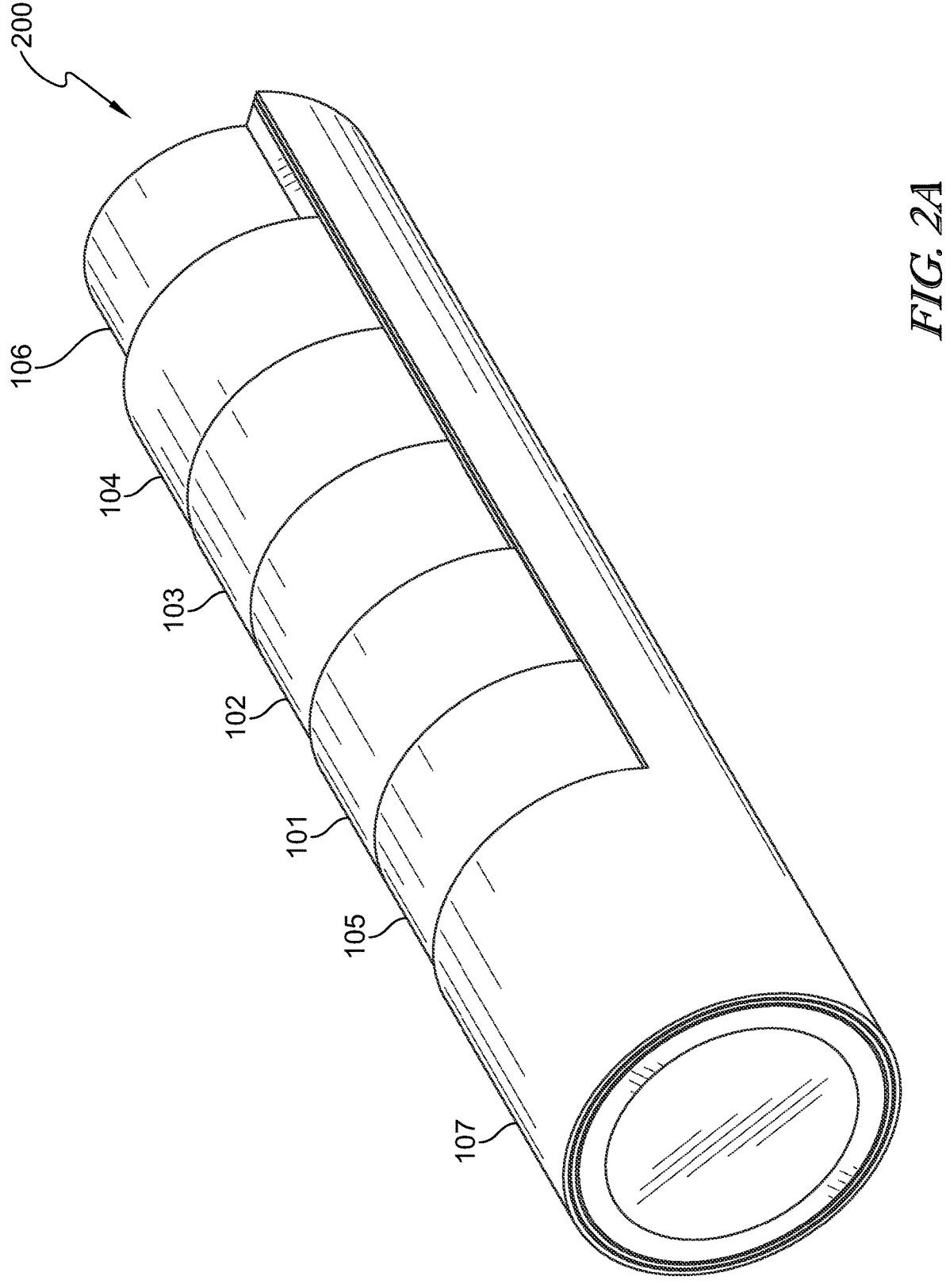
FIG. 2A is a cutaway view of a concentric electrochemical device.
Figure 2B:
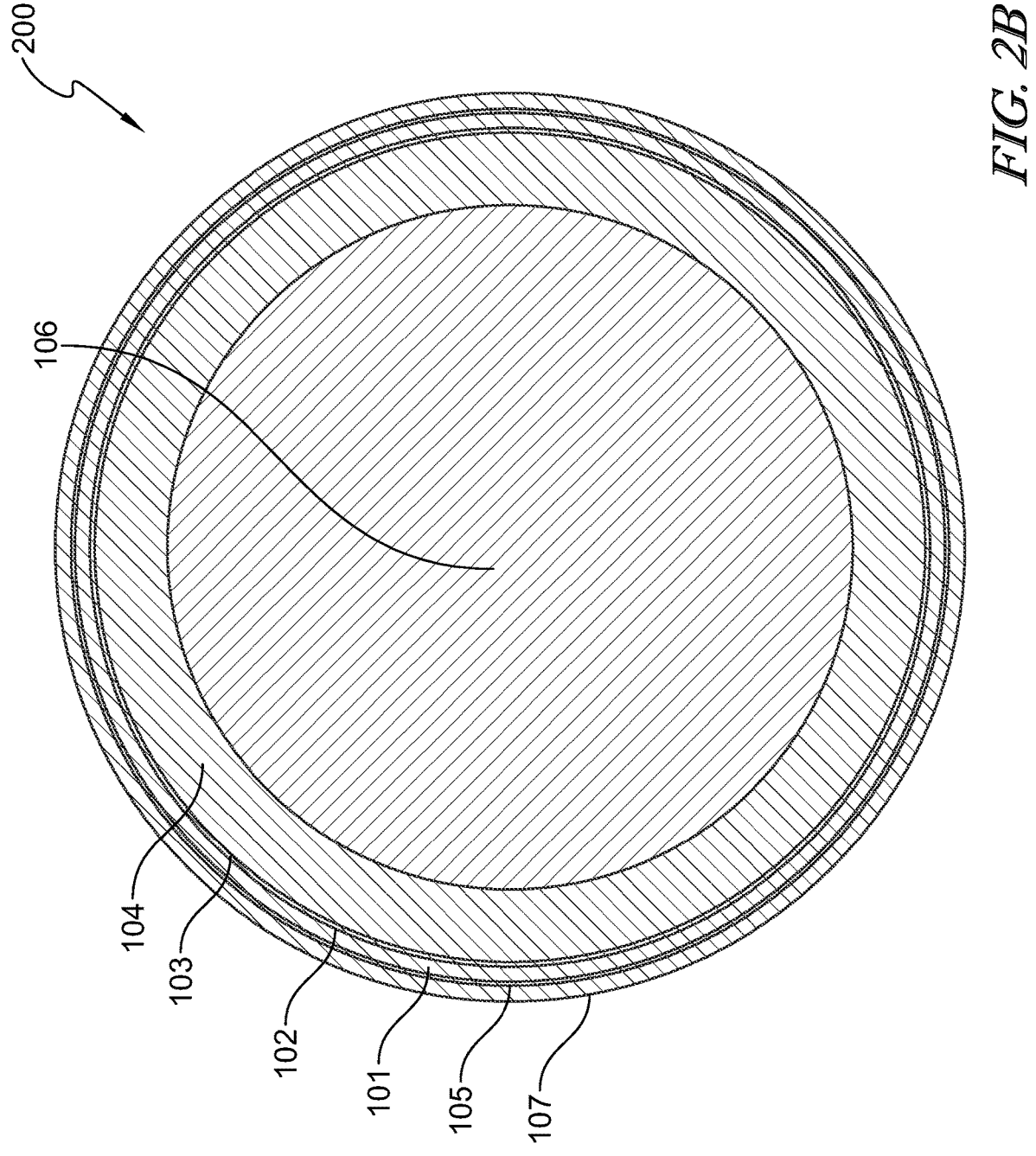
FIG. 2B is a top cross-sectional view of the concentric electrochemical device of FIG. 2A.

In one or more embodiments, as shown in FIGS. 2A-2B, electrochemical device 200 includes a feed spacer 102 arranged between the second electrode 104 (carbonaceous cathode) and the current collector housing 107. The feed spacer 102 is a chemical-resistant polymer mesh that decreases the packing density of the second electrode 104 to less than 100% allowing for material utilization throughout the entire length of the filter, which prevents clogging. Non-limiting examples of polymers for the feed spacer 102 include polypropylene, polyethylene, polytetrafluoroethylene (PTFE), nylon, ethylene tetrafluoroethylene (ETFE), or any combination thereof. In some embodiments, the feed spacer 102 is an expanded metal mesh. Non-limiting examples of expanded metal mesh for the feed spacer 102 include titanium, stainless steel, lead oxide, or any combination thereof.

In embodiments, the feed spacer 102 (FIGS. 1A-2B) is a planar structure (such as a sheet) arranged or formed into (such as by rolling) a cylindrical configuration (with a hole therethrough) with a sidewall thickness of about 1 to about 3000 micrometers. In some embodiments, the feed spacer 102 has a thickness of about 50 to about 250 micrometers. In other embodiments, the feed spacer 102 has a thickness of about, or in any range between about 1, 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975 and 3000 micrometers.

The total combined thickness of the separator 103 and the feed spacer 102, which separates the second electrode 104 from the first electrode 101 defines the "separation distance" between the electrodes. Thus, the separation distance between the second electrode 104 and the first electrode 101 (total thickness of separator 103 and feed spacer 102) is about 1 to about 5000 micrometers, as described above, in some embodiments. In other embodiments, the separation distance between the second electrode 104 and the first electrode 101 is about or in any range between about 1, 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, 4000, 4025, 4050, 4075, 4100, 4125, 4150, 4175, 4200, 4225, 4250, 4275, 4300, 4325, 4350, 4375, 4400, 4425, 4450, 4475, 4500, 4525, 4550, 4575, 4600, 4625, 4650, 4675, 4700, 4725, 4750, 4775, 4800, 4825, 4850, 4875, 4900, 4925, 4950, 4975, and 5000 micrometers.

The second electrode 104 is a carbon-based material. Non-limiting examples of the carbon-based material include carbon felt, woven carbon cloths, carbon films, activated carbon materials, or any combination thereof. The carbon-based materials comprise, consist of, or consist essentially of carbon. Carbon-based materials that "comprise" carbon include carbon and any other specified components, but may also include additional components not specified. Carbon-based materials that "consist of" carbon include only carbon and any other specified components, excluding any non-specified components. Carbon-based materials that "consist essentially of" carbon include carbon, any other specified components, and other components that do not materially affect the basic characteristics of the carbon-based material's core functionality.

Carbon cloths are woven, conductive, porous materials that either consist of (include only carbon) or consist essentially of carbon (include carbon and other components that do not materially affect the basic characteristics of the carbon cloth's core functionality). Woven cloths are textiles formed by weaving. The woven cloths have a high void fraction. Void ratio (or void fraction) describes the open porosity of a carbon material and how easily an aqueous solution can flow through the carbon material. The void ratio or void fraction is a measurement of the amount of aqueous solution (or water) displaced by a piece of carbon material of known dimensions and mass according to the following equation:

$$\text{Void ratio (\%)} = \frac{V_{carbon} - V_{water\,displaced}}{V_{carbon}} \times 100$$

where $V_{carbon}$ is the volume of the carbon, $V_{water\,displaced}$ is the volume of water (or aqueous solution) displaced. The units of $V_{carbon}$ and $V_{water\,displaced}$ are the same, resulting in a void ratio (%). In some embodiments, the woven cloths have a void fraction or void ratio of about 65% to about 99.9%. In other embodiments, the woven cloths have a void fraction of about 70% to about 99.9%. Still yet, in embodiments, the woven cloths have void fractions about or in any range between about 65%, 68%, 70%, 72%, 75%, 78%, 80%, 82%, 85%, 88%, 90%, 92%, 95%, 97%, 99%, and 99.9%.

In some embodiments, the woven cloths have a high surface area of about 700 to about 2300 square meters per gram. In other embodiments, the woven cloths have a high surface area of about 1200 to about 2300 square meters per gram. Yet, in other embodiments, the woven cloths have a high surface area of about or in any range between about 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, and 2300 square meters per gram.

In other embodiments, the woven cloths have a low surface area of about 0.1 to about 5 square meters per gram. Yet, in embodiments, the woven cloths have a low surface area of about or in any range between about 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, and 5.0 square meters per gram.

A non-limiting example of a woven cloth for the second electrode 104 is a high void fraction (e.g., about 65% to about 99.9%) and high surface area (e.g., about 700 to about 2300 square meters per gram) material. Another non-limiting example of a woven cloth for the carbon-based cathode is a high void fraction (e.g., about 70% to about 99.9%) and high surface area (e.g., about 1200 to about 2300 square meters per gram) material.

Carbon felts are non-woven porous materials that consist of (include only carbon) or consist essentially of carbon (include carbon and other components that do not materially affect the basic characteristics of the carbon felt's core functionality). In some embodiments, the carbon felts are activated carbon felts. In one or more embodiments, the carbon felt has a void fraction of about or greater than 95%. In other embodiments, the carbon felt has a void fraction of about, greater than, or in any range between about 95%, 96%, 97%, 98%, 99%, and 99.9%, for example about 95% to about 99%, about 95% to about 98%, about 95% to about 97%, and about 95% to about 96%. In one or more embodiments, the carbon felt has a void fraction of about 70% to about 99.9%. In other embodiments, the carbon felt has a void fraction of about or in any range between about 70%, 72%, 75%, 77%, 80%, 82%, 85%, 87%, 90%, 92%, 95%, 97%, 99%, and 99.9%.

In some embodiments, the carbon felt has a low surface area of less than 5 square meters per gram. Still yet, in other embodiments, the carbon felt has a low surface area of about or in any range between about 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, and 5.0 square meters per gram. In some embodiments, the carbon felt has a high surface area of about 1200 to about 2300 square meters per gram. Still yet, in other embodiments, the carbon felt has a surface area of about or in any range between about 1200, 1250, 1300, 1350, 1400, 1450, 1500, 1550, 1600, 1650, 1700, 1750, 1800, 1850, 1900, 1950, 2000, 2050, 2100, 2150, 2200, 2250, and 2300 square meters per gram.

A non-limiting example of a carbon felt for the second electrode 104 is a high void fraction (e.g., about or greater than 95%) and low surface area (e.g., about 0.1 square meters per gram to about 5 square meters per gram) material. Another non-limiting example of an activated carbon felt for the second electrode 104 is a high void fraction (e.g., about 70% to about 99.9%) and high surface area (e.g., about 1200 to about 2300 square meters per gram) material.

Carbon films are carbon composites that consists of (include only carbon) or consists essentially of carbon particles and a carbon binder (include carbon and a carbon binder and other components that do not materially affect the basic characteristics of the carbon film's core functionality). In one or more embodiments, the carbon film is an activated carbon film that is microporous and includes a binder.

Non-limiting examples of the binder of the activated carbon film include polyvinylidene fluoride (PVDF), polytetrafluoroethylene (PTFE), sodium alginate, sodium-carboxymethyl cellulose, an ion exchange polymer, or a combination thereof.

In one or more embodiments, the activated carbon film has a void fraction of about 30% to about 65%. In other embodiments, the activated carbon film electrode has a void fraction of about 30% to about 60%. Still yet, in other embodiments, the activated carbon film has a void fraction of about or in any range between about 30%, 35%, 40%, 45%, 50%, 55%, 60%, and 65%.

In some embodiments, the activated carbon film has a surface area of about 1200 to about 1400 square meters per gram. Still yet, in other embodiments, the activated carbon film has a surface area of about or in any range between about 1200, 1220, 1240, 1260, 1280, 1300, 1320, 1320, 1340, 1360, 1380, and 1400 square meters per gram.

A non-limiting example of an activated carbon film for the second electrode 104 is a low void fraction (about 30% to about 65%) and high surface area (about 1200 to about 1400 square meters per gram) material. In embodiments, the second electrode 104 is a planar structure (such as a sheet) arranged or formed into a cylindrical shape (such as by rolling) with a sidewall thickness of about 0.1 to about 10 millimeters. In some embodiments, the second electrode 104 has a thickness of about 2 to about 5 millimeters. In other embodiments, the second electrode 104 has a thickness of about or in any range between about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 4.7, 4.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, and 10.0 millimeters.

In one or more embodiments, the activated carbon material is formed from or includes a carbon powder, carbon particles, or a combination thereof.

In some embodiments, each second electrode 104 is a continuous planar structure (such as a sheet) arranged or formed into (such as by rolling) a cylindrical shape (with a hole therethrough), as shown in FIGS. 1A-1B, for example. In other embodiments, each second electrode 104 is composed of carbon material that is packed and arranged between the separator 103 and the current collector housing 107 to surround the metal-based anode (first electrode 101). In even other embodiments, the second electrode 104 is composed of a plurality of planar carbon pieces with an annular hole therethrough that are stacked. However, a shape of the second electrode 104 is not limited to these shapes and can be any shape with the above-described thickness.

In one or more embodiments, the second electrode 104 is a single homogenous layer of a carbon-material, such as a woven carbon cloth, a carbon felt, or a carbon film.

The first electrode 101 includes a metal substrate with a metal oxide coating. The metal substrate is any coatable metal or metal alloy. The metal substrate can include plates, solid rods, tubes, wires or knitted wires, and/or expanded meshes of metals or metal alloys. Non-limiting examples of metals for the metal substrate include titanium, tantalum, lead, zirconium, niobium, or any combination or alloy thereof. Non-limiting examples of metal alloys for the metal substrate include titanium nickel alloys, titanium cobalt alloys, titanium iron alloys, titanium copper alloys, or any combination thereof. According to some embodiments, the metal substrate is a titanium mesh.

In one or more embodiments, the first electrode 101 (metal-based anode) includes about 5 grams per square meter ($g/m^2$) of a precious metal or metals, but is not limited to this amount. For example, the metal-based anode includes less than 2 $g/m^2$, or greater than 8 $g/m^2$ of a precious metal or metals. In some embodiments, the metal-based anode includes about 1 $g/m^2$ to about 10 $g/m^2$ a precious metal or metals, about 2 $g/m^2$ to about 8 $g/m^2$ a precious metal or metals, about 3 $g/m^2$ to about 7 $g/m^2$ a precious metal or metals, or about 4 $g/m^2$ to about 6 $g/m^2$ a precious metal or metals. Non-limiting examples of the precious metal include platinum, gold, or any combination or alloy thereof.

Before applying the metal oxide coating, the metal substrate is optionally cleaned to obtain a clean metal surface. The metal substrate is cleaned by, for example, mechanical cleaning, degreasing, chemical or electrolytic cleaning, or any combination thereof. Optionally, the metal substrate is further etched to obtain a surface roughness or surface morphology. For example, acids, e.g., hydrochloric, sulfuric, perchloric, nitric, oxalic, tartaric, phosphoric acids, or combinations thereof, or caustic compounds, e.g., potassium hydroxide/hydrogen peroxide, are used to chemically etch the surface of the metal substrate. Plasma spraying is another example of a process used for providing a roughened metal surface.

Once prepared, the metal substrate is coated with one or more metal oxides. Non-limiting examples of metal oxides include platinum oxide, palladium oxide, rhodium oxide, iridium oxide, ruthenium oxide, mixtures thereof, or mixtures with other metals. Other non-limiting examples of metal oxides include manganese dioxide, lead dioxide, cobalt oxide, ferric oxide, platinate coatings (e.g., $M_xPt_3O_4$, where M is an alkali metal, and x is approximately 0.5), nickel-nickel oxide, nickel plus lanthanide oxides, or any combination thereof.

The metal oxide precursors for the coating are combined in a coating composition and applied to the metal substrate by any process that applies a liquid coating composition to a metal substrate. In embodiments, such methods include dip spin and dip drain techniques, brush applications, roller coating and spray applications, such as electrostatic spraying. Once a uniform coating is applied to the metal substrate, heat is applied to the coated metal substrate to effect thermal decomposition of the precursors and form the metal oxide coating. Heating is performed, for example, at a temperature of about 425 to about 535 degrees Celsius for about 3 to about 20 minutes and in an oxidative environment, such as in air or in oxygen.

In one or more embodiments, the metal oxide coating on the metal substrate includes ruthenium oxide, iridium oxide, titanium oxide, or a combination thereof. In some embodiments, ruthenium chloride ($RuCl_3$), iridium chloride ($IrCl_3$ or $H_2IrCl_3$), and titanium isopropoxide ($Ti\{OCH(CH_3)_2\}_4$), commonly referred to as titanium tetraisopropoxide or TTIP, are combined as precursors in a coating composition, which are deposited on the surface of the metal substrate to form the first electrode 101.

In other embodiments, the first electrode 101 is a planar structure (such as a sheet) arranged or formed into (such as by rolling) a cylindrical shape (with a hole therethrough) with a thickness of about 0.1 to about 6 millimeters. In some embodiments, the first electrode 101 has a thickness of about 0.1 to about 4.6 millimeters. In other embodiments, the first electrode 101 has a thickness of about or in any range between about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, and 6.0 millimeters.

In embodiments, the first electrode 101 is a rod structure with a diameter of about 1 to about 6 inches, that forms the core and eliminates the need for the current collector 106. In such embodiments, the electrochemical devices do not include a central current collector 106, and the first electrode 101 is arranged in the center of the concentric electrochemical device 100. In some embodiments, the first electrode 101 has a diameter of about 25 to about 152 millimeters. In other embodiments, the first electrode 101 has a diameter of about or in any range between about 25, 30, 35, 40, 45, 50, 55, 60, 65, 70, 75, 80, 85, 90, 95, 100, 105, 110, 115, 120, 125, 130, 135, 140, 145, 150, and 152 millimeters. The size of the first electrode 101 can be represented as a ratio of its radius to that of the current collector housing 107 with the following equation:

$$\text{Radius ratio } (\%) = \frac{R - r}{R} \times 100$$

where the radius of the current collector housing 107 is R, and the radius of the first electrode 101 is r. In some embodiments, this ratio is about 80%. In other embodiments, the ratio is in any range between about 10%, 15%, 20%, 25%, 30%, 35%, 45%, 50%, 55%, 60%, 65%, 70%, 75%, 80%, 85%, and 90%.

In some embodiments, as shown in FIG. 1A, a metal shim 105 is arranged between the second electrode 104 and the current collector housing 107 for ease of entry and removal of the materials from the housing 107. The metal shim 105 directly contacts current collector housing 107 and conducts current, behaving like a current collector, during operation of the electrochemical device 100.

The metal shim 105 is a solid or porous material. The metal shim 105 is a metal sheet, a foil sheet, a mesh sheet, a metal rod, and/or a metal tube. The metal shim 105 is a solid (i.e., non-porous) material in some embodiments. Non-limiting examples of materials for the metal shim 105 include one or more conductive metals, for example, aluminum, copper, graphite, titanium, stainless steel, or a combination thereof.

In some embodiments, the metal shim 105 is a rod structure with a diameter of about 1 to about 5 inches. In other embodiments, the metal shim 105 has a diameter of about 25 to about 125 millimeters. In other embodiments, the metal shim 105 has a diameter of about or in any range between about 25, 30, 35, 40, 45, 50, 55, 60, 65, 70, 75, 80, 85, 90, 95, 100, 105, 110, 115, 120, and 125 millimeters.

In some embodiments, as shown in FIG. 2A, a metal shim 105 may be arranged between the first electrode 101 and the current collector housing 107 for ease of entry and removal of the materials from the housing 107.

To make the concentric electrochemical device 100, the above-described layers of the cell, including the current collector 106 (optional), the first electrode 101 (carbonaceous cathode), the feed spacer 102 (optional), the separator 103, the second electrode 104 (metal-containing anode), the metal shim 105 (optional), and the current collector housing 107 are wound around one another in said order, with the current collector 106 as a central core and the current collector housing 107 as the external housing.

In some embodiments, as shown in FIGS. 1A-1B, the housing 107 surrounds concentric layers of an electrode stack. The housing 107 surrounds (optional) metal shim 105, which surrounds second electrode 104, which surrounds separator 103, which surrounds feed spacer 102, which surrounds first electrode 101, which surrounds current collector 106. In other embodiments, as shown in FIGS. 2A-2B, the housing 107 surrounds concentric layers of an electrode stack. The housing 107 surrounds (optional) metal shim 105, which surrounds first electrode 101, which surrounds feed spacer 102, which surrounds separator 103, which surrounds second electrode 104, which surrounds current collector 106.

The electrodes have an asymmetric configuration. In some embodiments, carbonaceous cathode (second electrode 104) has a larger geometric surface area than the metal-containing anode (first electrode 101). In other embodiments, the metal-containing anode (first electrode 101) has a larger geometric surface area than the carbonaceous cathode (second electrode 104).

To collect metal on the carbonaceous electrode, the electrochemical device is connected to a power supply via the electrical connectors and wiring, and a controller applies a potential (E+ or E−) to the electrodes. The asymmetry of the electrodes provides a voltage distribution across the electrodes, which equates to a different voltage at each electrode that controls the speciation of the target ionic species at the electrodes. A negative voltage is applied to the carbonaceous cathode, and a positive voltage is applied to the metal-containing anode. As a result, the removal of the target ionic species can be forced to occur predominately by plating on the carbonaceous cathode, as explained in detail below. The applied voltage is split between the carbonaceous cathode and the metal-containing anode according to the electrodes' material properties, such as mass, area, surface area, resistance, etc., and the chemical reaction(s) occurring. For example, if 1.6 V is applied to the device, the carbonaceous cathode may have an applied voltage of −0.9 V versus standard hydrogen electrode (SHE) and the metal-containing anode may have an applied voltage of +0.7 V versus SHE.

Upon application of a voltage/potential to the electrochemical device, the target species are removed or reduced from the aqueous solution by various processes, including but not limited to, one or more of physical adsorption to an electrode; electrical attraction (capacitive adsorption) to an electrode; electron transfer reactions that directly or indirectly create new target species (Faradaic reactions) that remain in solution or become immobilized on an electrode. Chromium, in the form of Cr (VI) is reduced to Cr (III) on the carbonaceous cathode. The applied voltage is selected to effect electroplating of target species on the carbon-based cathode (second electrode 104). In some embodiments, electroplating (also referred to as electrodeposition or plating) used in the herein described electrochemical devices removes the target species from the aqueous solution by reduction to form a solid copper metal (i.e., $Cu^{2+}$ in solution is electroplated as Cu(s)) on the second electrode 104).

The Pourbaix diagram of the target species is used to select the voltage and pH conditions to electroplate or reduce the target on the second electrode 104. A Pourbaix diagram is specific for a particular species and shows potential/voltage (y-axis) as a function of pH (x-axis). The Pourbaix diagram illustrates possible stable (equilibrium) phases of the target species in an aqueous electrochemical system. The desired applied potential (E) is selected and applied to electroplate (or electrodeposit) the target species on the second electrode 104 (the electrode at which a negative potential will be applied). The Pourbaix diagram for each target species in the aqueous solution is used to determine the operating conditions (i.e., electrode voltage and pH) under which the target species will be removed or partially removed (by Faradaic reactions) from the aqueous solution by electroplating as a reduced solid. Pourbaix diagrams for various target species are available from various sources, including for example, Pourbaix, Marcel, Atlas of Electrochemical Equilibria in Aqueous Solutions, Houston, TX, National Association of Corrosion Engineers, 1974, incorporated herein in its entirety by reference.

Figure 3:
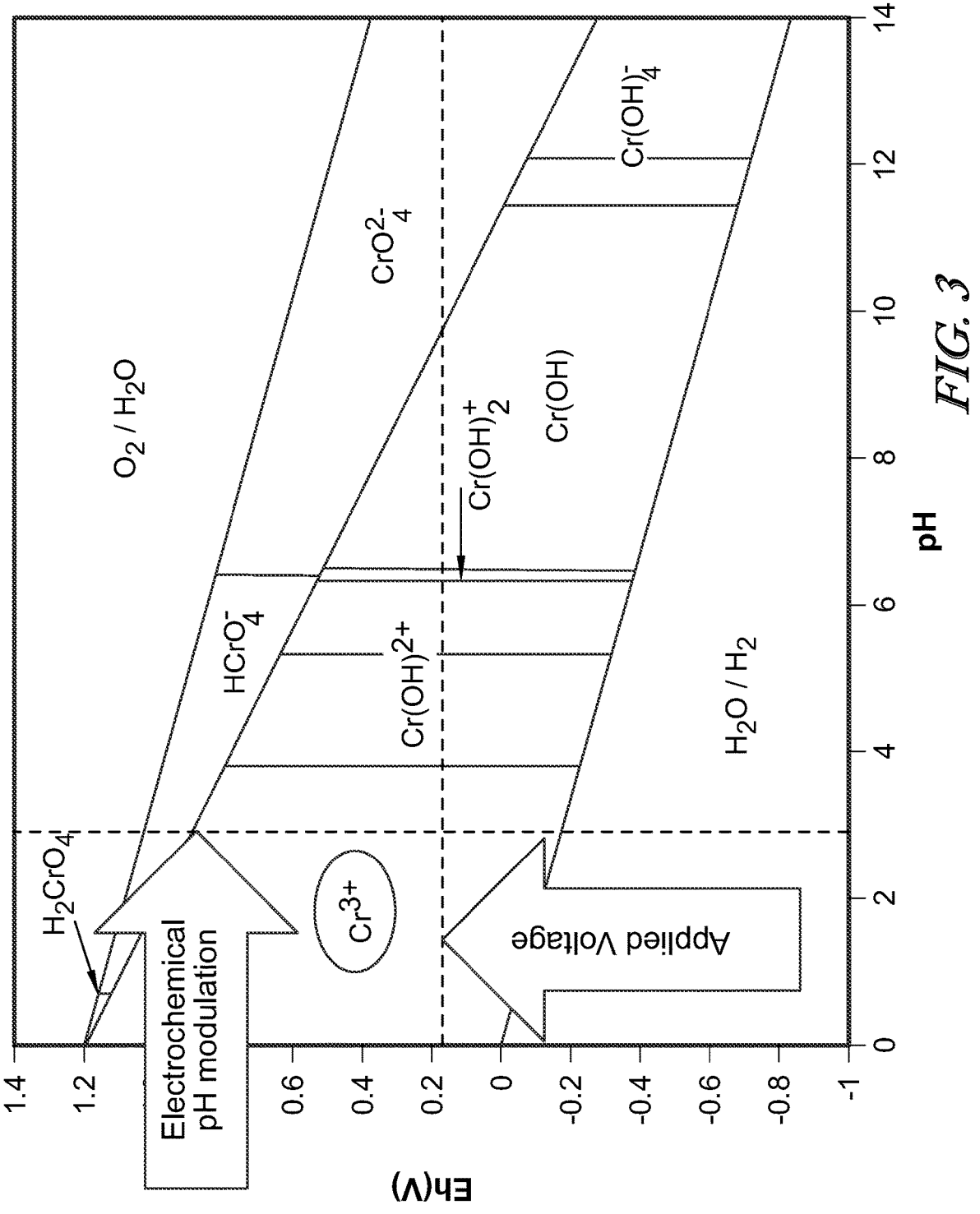
FIG. 3 is a Pourbaix diagram for chromium (Cr)

An example of a Pourbaix diagram for chromium is shown in FIG. 3. Predominant ion boundaries are represented by lines, and as such, the Pourbaix diagram is read much like a standard phase diagram with a different set of axes, with potential (V) on the y-axis, and pH on the x-axis. The bulk aqueous solution includes Cr(III)/Cr(VI) ions, which are chromium hydroxides under alkaline conditions, and Cr(III) ions under the shown operating conditions. In particular, when applying a voltage of about 0.2 V to the carbon-based cathode (illustrated by the horizontal line the pH (illustrated by the vertical line) is modulated such that the intersection with the potential (horizontal line) represents the species of the metal that will exist under those conditions. With an applied voltage of about –0.3 V to about –0.4 V versus a normal hydrogen electrode (NHE), Cr(VI) is reduced to Cr(III) at the cathode when the pH is less than about 4.

Figure 4:
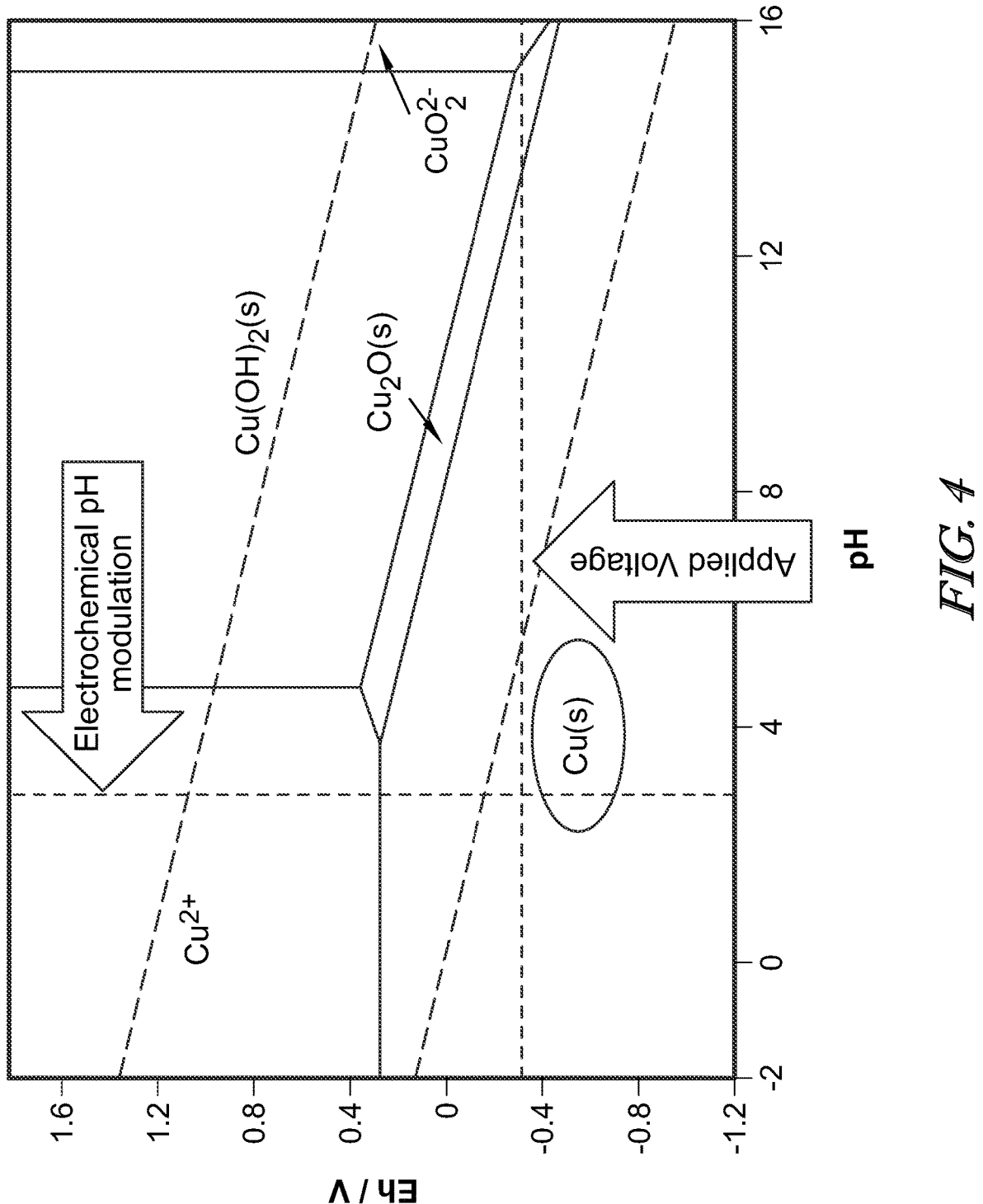
FIG. 4 is a Pourbaix diagram for copper (Cu)

An example of a Pourbaix diagram for copper is shown in FIG. 4. The bulk aqueous solution includes copper ions as $Cu^{2+}$, which are $Cu(OH)_2(s)$ and $Cu_2O(s)$ under alkaline conditions, and electroplated as Cu(s) on the cathode under the shown operating conditions. In particular, when applying a voltage of –0.3 V to the carbon-based cathode as illustrated by the horizontal line, the pH (illustrated by the vertical line) is modulated such that the intersection with the potential (horizontal line) represents the species of the metal that will exist under those conditions. With an applied voltage of about –0.3 V to about –0.4 V versus a normal hydrogen electrode (NHE), copper (Cu(s)) is plated on the cathode when the pH is 0 to 14.

Other target species can be removed under similar mechanisms but under different voltage regions. In embodiments, a cell potential of about 0.6 to about 3.5 Volts is applied to the electrochemical device, which will be split between the cathode and anode. In other embodiments, a cell potential about or in any range between about 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4 and 3.5 Volts.

A negative potential (E–) is applied to the cathode, and a positive potential (E+) is applied to the anode. The potential (V) and pH at each of the anode and cathode are measured, and the operating condition (i.e., the applied potential) is adjusted to obtain a near electrode potential (i.e., anode potential) and pH that corresponds to conditions under which the target species will be electroplated and removed from the aqueous solution. The electrochemical cell is maintained under favorable conditions to effect electroplating of the target ionic species from the aqueous solution at the carbon-based cathode. Table 1 below shows operating conditions, including total applied cell voltage ranges used in one or more embodiments with water oxidation as the balancing reaction.

TABLE 1

| Operating conditions for electroplating target species | |
| --- | --- |
| Target species | Operating Conditions |
| Pb | Greater than 1.8 V |
| Cu | Greater than 1.0 V |
| Cr | Greater than 0.8 V |

EXAMPLES

Example 1

Electrochemical devices included a metal-based anode and a carbon-based cathode. The anode was a mixed metal oxide anode formulated from a combination of ruthenium oxide and iridium oxide coated on a titanium rod. The cathode was a carbon felt. Both a separator and a feed spacer were used. A current collector housing in contact with the carbon-based cathode was stainless steel. Tap water was spiked with 26 parts per million (ppm) Cr with 1% by mass sulfuric acid ($H_2SO_4$) and treated at 2 gallons per minute (gpm) with a constant current of 20.0 A (vs. a theoretical requirement of 17.5 A). The Cr concentration was reduced from 26.2 ppm to 3.24 ppm, providing ~88% reduction in a single pass.

Example 2

Figure 5:
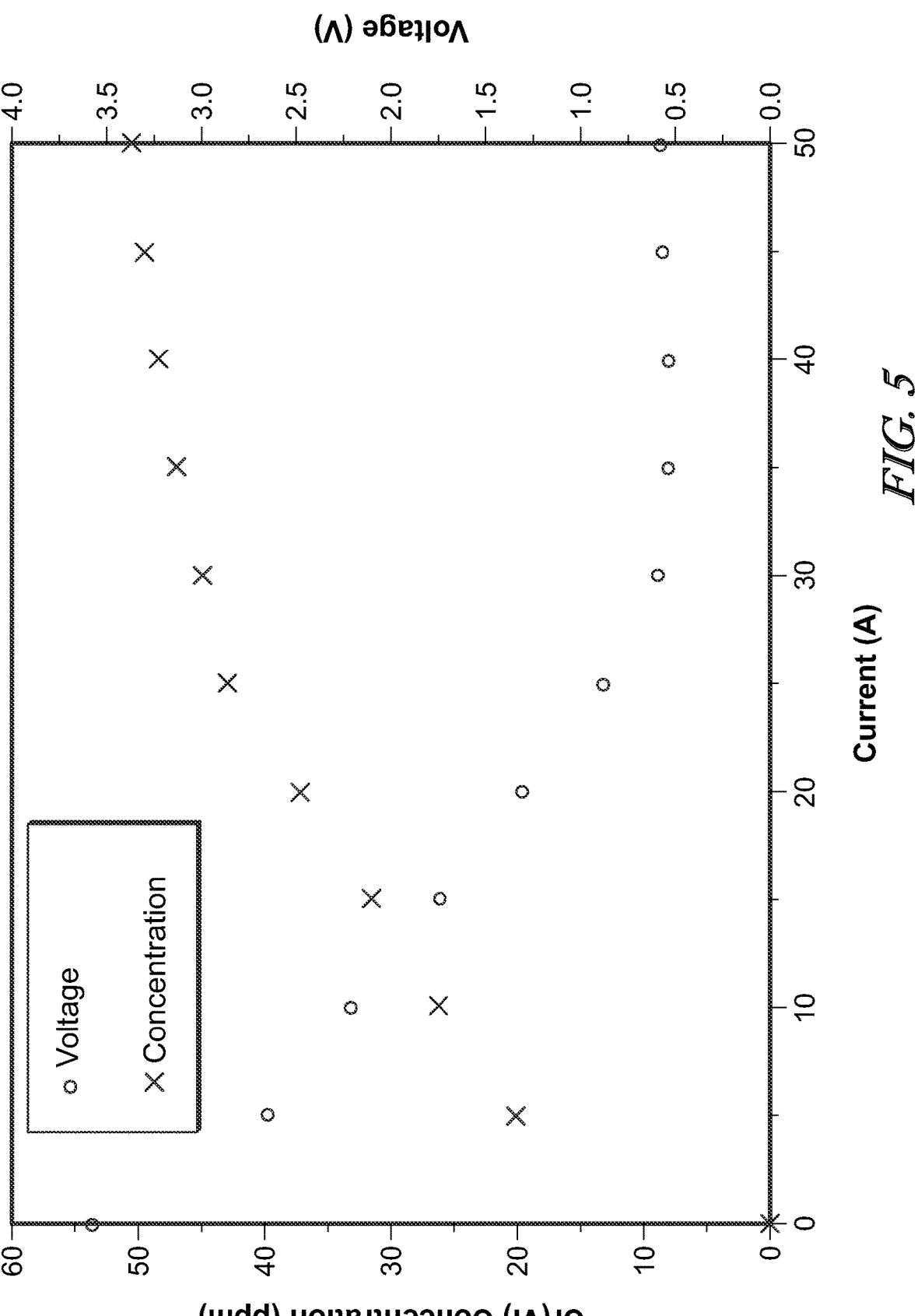
FIG. 5 is a graph of hexavalent chromium (Cr (VI)) concentration (parts per million, ppm) and voltage (volts, V) vs. current (Amperes, A), and shows results demonstrating the reduction of hexavalent chromium.

The same electrochemical device design and materials as described in Example 1 were used. Tap water was spiked with ~55 ppm Cr with 1% by mass $H_2SO_4$ and treated at 2 gpm. Cr reduction was observed at 1.5 V, with performance dramatically improving above 2.0 V, and reaching steady state at an effluent concentration of ~10 ppm at about 3.0 V. A single pass reduction of up to 85% was achieved. Results are shown in FIG. 5.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on," "on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semi-conductor layers at the interface of the two elements.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An electrochemical device for reducing a dissolved metal of a liquid stream, the electrochemical device comprising:
  a carbonaceous cathode surrounding a metal-containing anode;
  a separator arranged between the metal-containing anode and the carbonaceous cathode; and
  either one of:
    a conductive cathode current collector housing on the carbonaceous cathode, the conductive cathode current collector housing comprising at least one inlet and outlet for the liquid stream; or
    a non-conductive cathode current collector housing on the carbonaceous cathode, the non-conductive cathode current collector housing comprising at least one inlet and outlet for the liquid stream, and a metal shim arranged between the carbonaceous cathode and the non-conductive cathode current collector housing.

2. The electrochemical device of claim 1, wherein a feed spacer is arranged between the metal-containing anode and the separator.

3. The electrochemical device of claim 1, wherein the carbonaceous cathode is a carbon felt, a woven carbon cloth, a carbon film, or an activated carbon material.

4. The electrochemical device of claim 1, wherein the metal-containing anode is a solid rod or a film.

5. The electrochemical device of claim 4, wherein a conductive anode current collector is in contact with the metal-containing anode, and the metal-containing anode is arranged between the conductive anode current collector and the separator.

6. The electrochemical device of claim 5, wherein the conductive anode current collector is non-porous, a solid rod, or a combination thereof.

7. The electrochemical device of claim 1, wherein the carbonaceous cathode has a larger geometric surface area than the metal-containing anode; or wherein the metal-containing anode has a larger geometric surface area than the carbonaceous cathode.

8. An electrochemical device for reducing a dissolved metal of a liquid stream, the electrochemical device comprising:
  a metal-containing cathode core and a carbonaceous anode;
  a separator arranged between the metal-containing cathode and the carbonaceous anode; and
  either one of:
    a conductive anode current collector housing on the carbonaceous anode, the conductive anode current collector housing comprising at least one inlet and outlet for the liquid stream; or
    a non-conductive cathode current collector housing on the carbonaceous anode, the non-conductive cathode current collector housing comprising at least one inlet and outlet for the liquid stream, and a metal shim arranged between the carbonaceous anode and the non-conductive cathode current collector housing.

9. The electrochemical device of claim 8, wherein a feed spacer is arranged between the metal-containing cathode and the separator.

10. The electrochemical device of claim 8, wherein the carbonaceous anode is a carbon felt, a woven carbon cloth, a carbon film, or an activated carbon material.

11. The electrochemical device of claim 8, wherein the metal-containing cathode is a solid rod or a film.

12. The electrochemical device of claim 11, wherein a conductive cathode current collector is in contact with the metal-containing cathode, and the metal-containing cathode is arranged between the conductive cathode current collector and the separator.

13. The electrochemical device of claim 12, wherein the conductive cathode current collector is non-porous, a solid rod, or a combination thereof.

14. The electrochemical device of claim 8, wherein the carbonaceous anode has a larger geometric surface area than the metal-containing cathode; or wherein the metal-containing cathode has a larger geometric surface area than the carbonaceous anode.

15. An electrochemical device for reducing a dissolved metal of a liquid stream, the electrochemical device comprising:

a carbonaceous anode and a metal-containing cathode;

a conductive anode current collector rod structure at a core of the electrochemical device and in contact with the carbonaceous anode;

a separator arranged between the carbonaceous anode and the metal-containing cathode; and either one of:

a conductive cathode current collector housing on the metal-containing cathode, the conductive cathode current collector housing comprising at least one inlet and outlet for the liquid stream; or a non-conductive cathode current collector housing on the metal-containing cathode, the non-conductive cathode current collector housing comprising at least one inlet and outlet for the liquid stream, and a metal shim arranged between the metal-containing cathode and the non-conductive cathode current collector housing.

16. The electrochemical device of claim 15, wherein a feed spacer is arranged between the metal-containing cathode and the separator.

17. The electrochemical device of claim 15, wherein the carbonaceous anode is a carbon felt, a woven carbon cloth, a carbon film, or an activated carbon material.

18. The electrochemical device of claim 15, wherein the metal-containing cathode is a film.

19. The electrochemical device of claim 15, wherein the conductive anode current collector is non-porous.

20. The electrochemical device of claim 15, wherein the carbonaceous anode has a larger geometric surface area than the metal-containing anode; or wherein the metal-containing cathode has a larger geometric surface area than the carbonaceous cathode.

* * * * *